March 3, 1936.　　R. DE O. McDILL ET AL　　2,033,044
APPARATUS FOR TREATING FRUIT
Filed July 11, 1930　　3 Sheets-Sheet 1
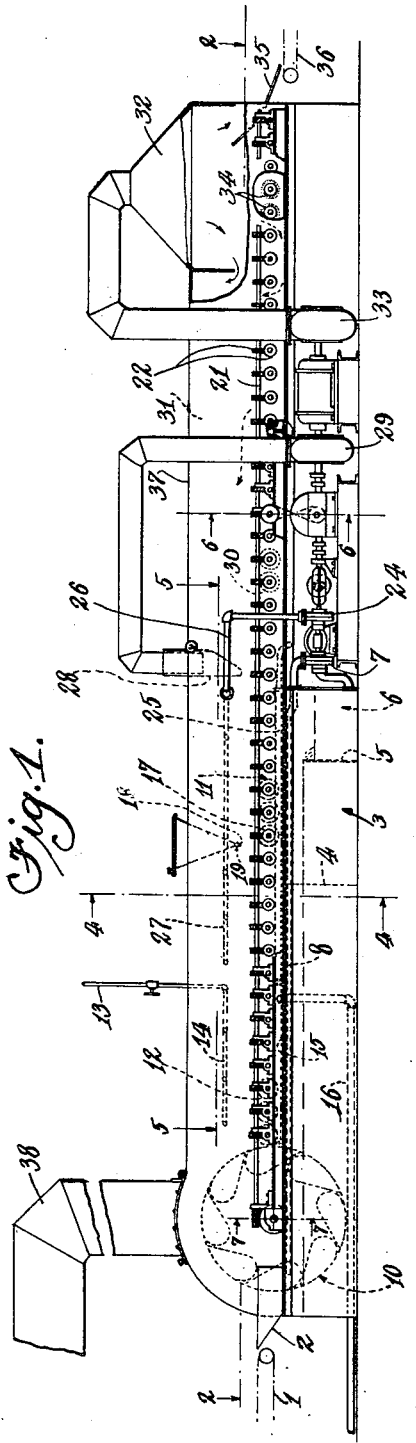
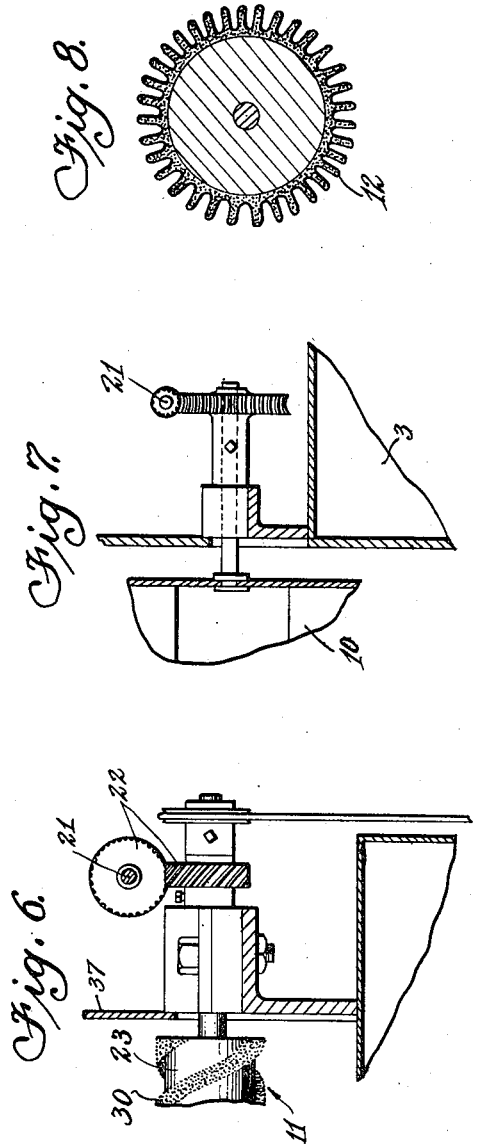
Inventors
Rex DeOre McDill
Lloyd E. Jones
By Lyon & Lyon
Attorneys March 3, 1936.   R. DE O. McDILL ET AL   2,033,044
APPARATUS FOR TREATING FRUIT
Filed July 11, 1930   3 Sheets-Sheet 2
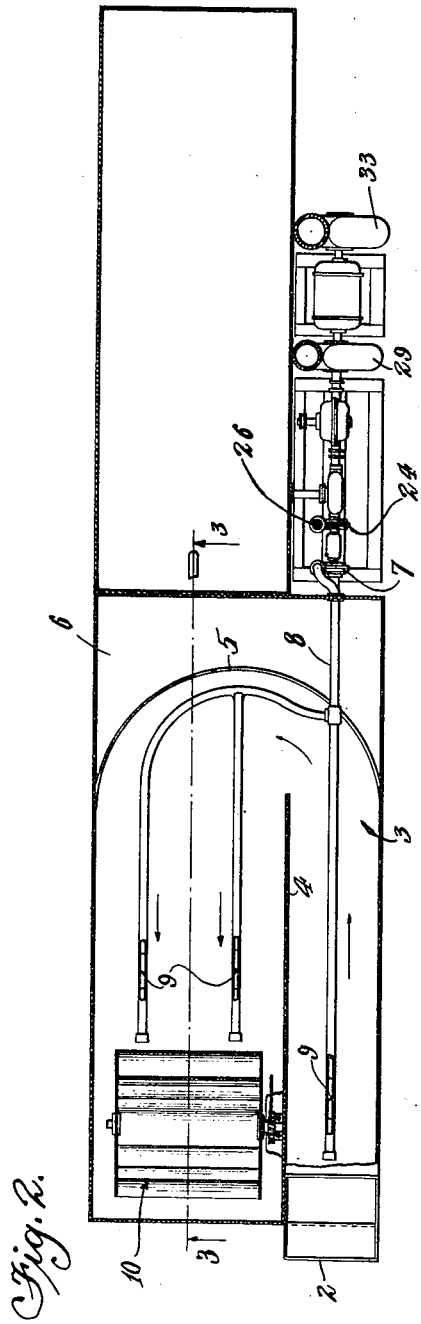
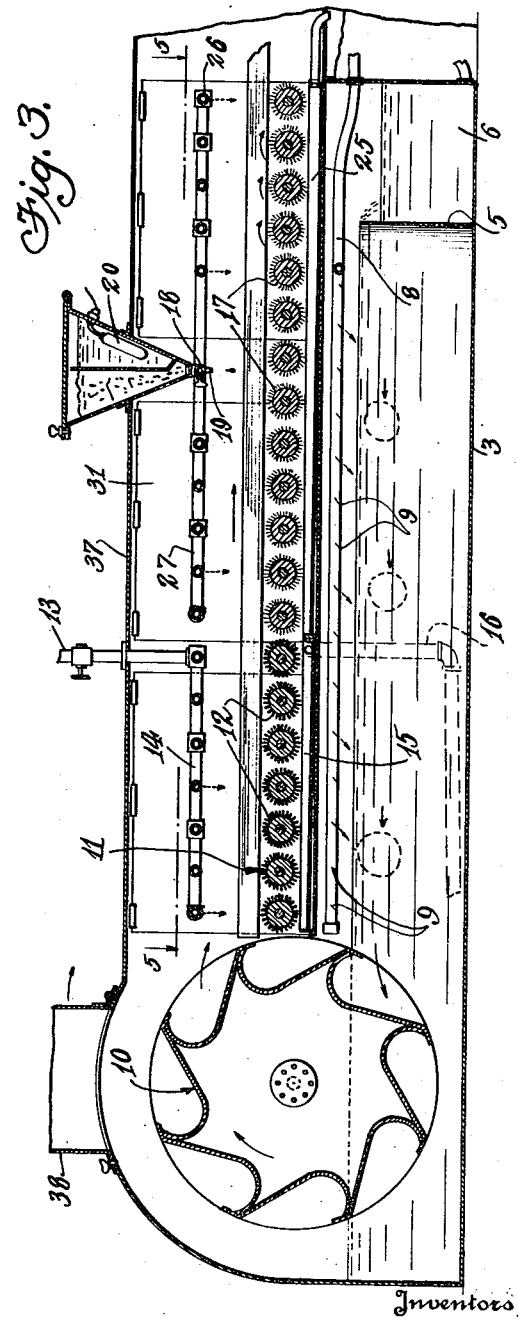

March 3, 1936.  R. DE O. McDILL ET AL  2,033,044
APPARATUS FOR TREATING FRUIT
Filed July 11, 1930   3 Sheets-Sheet 3

Inventor
Rex De Ore McDill
Lloyd E. Jones
By Lyon & Lyon
Attorneys

Patented Mar. 3, 1936

2,033,044

UNITED STATES PATENT OFFICE 2,033,044

APPARATUS FOR TREATING FRUIT

Rex De Ore McDill, Riverside, and Lloyd E. Jones, Santa Monica, Calif., assignors to Food Machinery Corporation, San Jose, Calif., a corporation of Delaware Application July 11, 1930, Serial No. 467,258

8 Claims. (Cl. 91—25)

This invention relates to apparatus for treating fruit preparatory to the transit of the fruit to market and for applying the solution of a mold inhibiting agent to the fruit followed by applying a coating of a material adapted to prevent shrinkage of the fruit, and to the final polishing of the same.

Preparatory to transit to the market, the fruit is subjected to three major operations. The first of these operations is for the purpose of cleaning the fruit from dirt and scale. The second is for the purpose of killing and retarding the growth of mold spores, and the third is for the purpose of reducing shrinkage of the fruit and to restore to the fruit a fresh or polished appearance.

The apparatus now in use for accomplishing these operations all require an excessive amount of handling of the fruit in which the fruit is passed from one operation to another through different conveyors etc., with the result that the fruit is subjected to excessive handling by the treating apparatus.

It has been found that particularly in connection with citrus fruit the perfect fruit with the unbroken skin is not subject to decay by mold spores, such as blue and green mold. When, however, the skin of the orange is broken by operations incidental to packing the fruit, an opportunity for mold decay is afforded and the tendency of fruit to decay is greatly increased by increased handling.

The present invention has for its general object the provision of an apparatus for treating fruit in which the cleansing, disinfecting and coating of the fruit all may be accomplished by a single unit of apparatus in which the handling of the fruit is minimized.

More particularly, the present invention is designed to provide an apparatus for handling fruit in which washing and disinfecting operations are combined, and in which the fruit is passed through a single uninterrupted path wherein all of the other operations of rinsing, coating and drying of the fruit are performed.

A further object of the present invention is to provide an apparatus in which the fruit may be covered with a coating material without the necessity of first passing the fruit through a drier, and in which the coating material can be applied to the fruit without the necessity of excessive heating of the coating material and thus, injury to the fruit ordinarily produced by these operations is avoided.

It is another object of the present invention to provide an apparatus in which damage to the skin of the fruit incidental to brushing or spreading a coating of material upon the fruit is minimized through the use of water or other aqueous fluids during the spreading operations, which have the effect of, to an extent, lubricating and reducing the abrasive action of the brushes on the fruit.

A further object of the present invention is to provide an apparatus for treating fruit in which less heat is necessary in order to finally dry the fruit, and in which the fruit is in part protected from injury from the heat of the drying operation on account of the presence of the coating of protective material upon the fruit imposed previous to the drying operation.

Various further objects and advantages of the present invention will be apparent from the description of a preferred form or example of an apparatus embodying the invention. For this purpose we hereafter describe, with reference to the accompanying drawings, a preferred form or example of the invention.

In the drawings:

Figure 1 is a diagrammatic elevation of an apparatus embodying the invention,

Figure 2 is a plan view of the apparatus.

Figure 3 is an enlarged section on line 3—3 of Figure 2.

Figure 6 is a detail of the brush driving means.

Figure 7 is a detail of elevator drive.

Figure 8 is a detail of the rubber brush.

Figure 4:
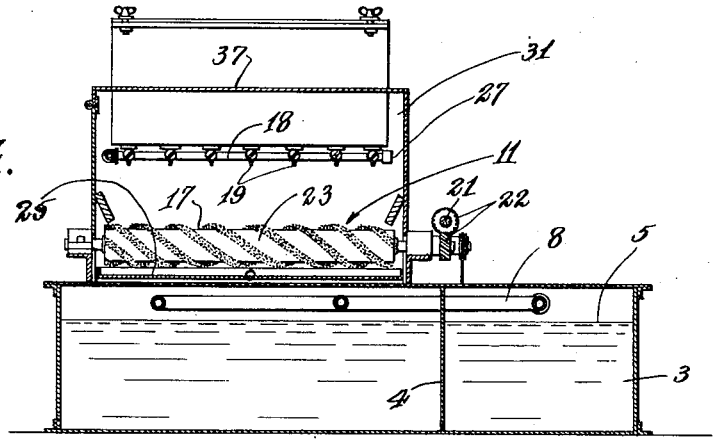
Figure 4 is a section on line 4—4 of Figure 1.
Figure 5:
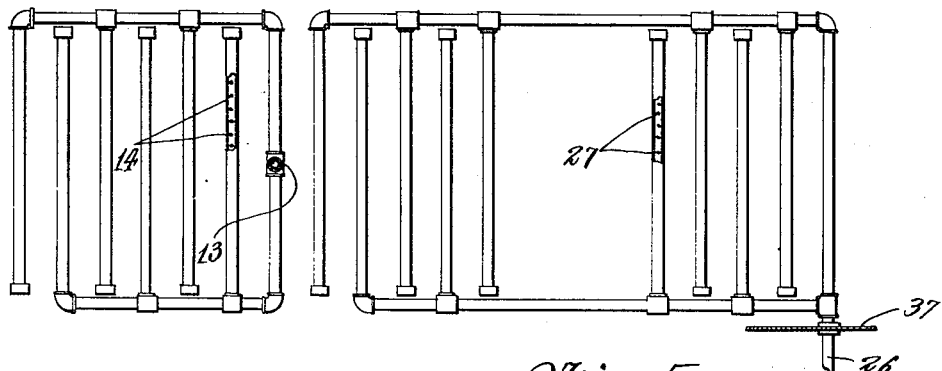
Figure 5 is a plan view of the arrangement of certain spray lines.
Figure 9:
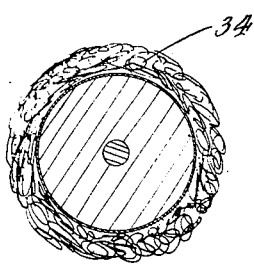
Figure 9 is a detail of lamb's wool brush.

Referring to the drawings, the apparatus for treating fruit embodying this invention is in its preferred form as follows:

Fruit is delivered to the apparatus by any suitable means such as the conveyor 1, which deposits the fruit upon a feed board or chute 2 from which it enters a soaking tank 3. The soaking tank 3 is illustrated as having a longitudinal baffle 4 dividing the soaking tank into a forward and return passage for the fruit so that the fruit after passing through the soaking tank, is returned near the forward end thereof.

The soaking tank 3 is indicated as having a weir 5 at one end over which the solution may overflow into a supply tank 6 of a pump 7. By the provision of the weir or overflow means we insure that the height of the treating solution in the tank 3 is always the same. In this manner we secure a more accurate regulation of the treating process and apparatus and insure the maintenance of predetermined desired operating conditions. From the supply tank 6 to the pump 7 the overflowing solution is taken by the pump 7 and passed by re-circulating means or lines 8 back to the treating tank 3, where it is applied to the fruit in the treating tank 3 by means of sprays 9. The sprays 9 are so disposed and formed as to direct jets of the treating solution against the fruit in the soaking tank 3 in such manner as to strike the fruit and duck the same in the soaking solution, at the same time spinning the fruit and advancing the same through the desired treating path.

The apparatus of the present invention may employ any one of various treating solutions, such as solutions of borax, sodium carbonate or in some cases, plain water or merely water solutions of washing fluids.

In the preferred form of the invention, however, we employ solutions of sodium hypochlorite of any desired strength, preferably including sodium bicarbonate for the purpose of stabilizing the same and rendering constant the alkalinity of the solution. The use of sodium hypochlorite on treating fruits functions both as a cleansing medium because of the alkaline character of sodium hypochlorite and also serves as an effective agent for retarding and controlling the growth of mold spores.

By the apparatus herein illustrated for applying the treating solution, not only is the constant level maintained which facilitates regulating constant the point of admission and discharge of the fruit and also functions in assuring immersion and complete contact of all of the fruit with the solution, as well as the advance of the fruit, but the re-circulating means, including the sprays 9, are of value and benefit in the process and apparatus in that they serve to carry into the soaking tank material quantities of air so that the contents of the soaking tanks are at all times aerated. The aeration of the soaking tank is found to enhance the activity and effectiveness of the solution of the mold retarding agent. This may be accounted for either upon the theory that the oxygen of the air in the presence of mold retarding agents has certain beneficial effects upon the molds or that the carbon dioxide content of the air acts to facilitate the liberation of chlorine and hypochlorous acid from the solution, increasing the effectiveness thereof.

At the discharge end of the treating path defined by the baffle of soaking tank 3, there is provided an elevating means 10 which may be of any desired or preferred construction. Said elevating means 10 deposits the fruit upon a continuous sequence of brushes 11 which extends throughout the remainder of the treating apparatus and define an unbroken path for the fruit where all further operations of treating the fruit are performed. By performing all of the operations of treating the fruit upon a continuous path of brushes as thus provided, we greatly reduce injuries to the fruit which are occasioned by the treating apparatus now in general use.

Preferably, part of the runway of brushes is superimposed over the soaking and treating tank 3 in order to consolidate the apparatus and reduce the space necessary to be occupied thereby in packing houses. The first series or group of brushes 12 on the brush path 11 are preferably utilized for the purpose of rinsing from and removing a greater part of the solution of the mold inhibiting agent from the fruit. These brushes also serve for brushing off and removing the dirt and scale which has been loosened by the action of the alkaline material within the tank 3.

For this purpose there is shown a rinsing line 13 leading above the brushes 12 and there terminating in sprays 14 capable of spraying the rinsing water and other fluid upon the fruit which is passed over the brushes. Below the brushes 12 there is provided a collection pan 15 which covers a part of the soaking tank 3 and is capable of collecting the rinsing water and discharging the same through a line 16.

Preferably, the brushes 12 are formed of material resistant to the action of the hypochlorite, and we prefer to make the brushes 12 of rubber. The majority of the hypochlorite solution is rinsed from the fruit in this portion of the operation, since it has been found to be detrimental or has a disintegrating effect upon fiber brushes such as are employed in the remainder of the apparatus. However, the invention includes a process wherein the brushes 12 may be omitted and the fruit containing the full strength hypochlorite solution from the tank 3 passes directly to the succeeding operations.

From the rinsing zone of the brush-way 11 the fruit passes onto a further series of brushes which are preferably of fiber. In this zone of the brush runway the first group of brushes may be used merely for additionally rinsing or cleaning the fruit, although in any case, the fruit still may contain a part at least of a hypochlorite solution.

The fruit then comes into contact with brushes which are coated with a material which is intended to be spread upon the fruit in the continuous film for the purpose of retarding shrinkage of the fruit in transit to the market. Various means may be utilized for getting the coating composition on the brushes and various different coating compositions and materials may be employed. We, however, prefer to employ a coating composition consisting of a mixture of paraffin wax and chlorcosane such as is obtained by partially chlorinating paraffin wax. For example, we employ a mixture made from chlorinating paraffin wax having a melting point of 140° F. until 25 percent increase in weight is observed. This material is of a salve-like consistency, being neither oil nor solid wax. As such, it may be applied cold to the fruit and all of the damage to the fruit incidental to the application of heated coating material or applying a solid coating material is thereby avoided. The application of the coating material to the brushes 17 in this zone of the apparatus may be by drip applicators 18 such as are shown in Figure 3 of the drawings. These drip applicators 18 include discharge orifices controlled by petcocks 19 by which the rate that the wax is applied to the brushes may be regulated.

The applicators may also preferably include electric heaters 20 for the purpose of making the coating composition more liquid in the applicators and facilitating the feeding thereof. The slight heating of the coating composition employed in the applicators 18 is, however, ineffective for injuring the fruit since, as hereafter pointed out, the coating as it is applied to the fruit and the fruit itself is maintained cool by a continuous spray of water. The major part of the wax is received first on the brushes where it is congealed by the water and later spread by the brushes on the fruit. Another and preferable method of applying this wax is not shown as is also true of an added appliance for clearing fruit out of the machine.

The fiber brushes 17 are preferably mounted on axes extending transverse to the passage of fruit down the brush-way and are driven, as well as the brushes 15, by a shaft 21 with helical gears 22. Each of the brushes is preferably provided with a spiral groove 23 as indicated in Figure 4, the spirals of adjacent brushes being opposed to each other so that the spirals do not operate for advancing the fruit but maintain the fruit generally in constant position and apply pressure in opposed directions for spreading the coating composition. The spirals also operate for revolving the fruit in a direction at right angles to its line of travel so that all portions of the fruit will insure adequate contact with the spreading brushes.

There is also provided a pump 24 which takes fluid, such as water, from a collection pan 25 under the brushes 17 and covering part of the settling tank 3, and circulates the water through a circulating line 26 and sprays 27 which spray the water down upon the brushes which are operating for spreading the coating composition. The forward set of sprays which are in advance of the applicators may serve only for additional rinsing or cleaning of the fruit. By means of the sprays 27 the coating compositions, the brushes and the fruit are all maintained wet during the coating operations.

It has been discovered that this method of applying a coating composition possesses several distinct advantages over the usual dry method of treatment. Among these advantages are first that the water has a slight tendency to emulsify the surface of the coating composition, reduces the surface tension thereof, and thus reduces the temperature at which the coating composition may be spread. At the same time, the water insures that the coating composition will be more even and uniformly spread upon the fruit. It also insures that the friction between the fruit and the brushes will not heat the fruit since it absorbs any heat and it further operates to assist in lubricating the contact between the fruit and the brushes, resulting therefore in an application of a coating composition to the fruit with a minimum puncturing of the skin of the fruit.

The coating of the fruit with the coating composition while the fruit is wet also, of course, eliminates all of those dangers to the fruit which are incidental to removing the fruit from the brush run-way, passing the same through a drier and then returning the same to the brushes.

At the end of the brushes 17 in the applicator zone of the brushway, there is provided a blower 28 which is connected with the fan 29 and directs a blast of air down upon the fruit. The blower 28 functions to remove a greater portion of the moisture from the fruit by blowing the same from the fruit. It is found that when fruit is coated with a material while it is wet with water, as herein described, and at the same time brushed, the coating composition is brushed against the surface of the fruit where it is deposited as a thin, but solid or continuous film, while the water and moisture are forced to the surface of the coating where it is readily removed by blowing. In this manner, the coating of the fruit while wet thus facilitates markedly the drying operations and decreases heating of the fruit which is necessary to secure a completely dried fruit.

From the blower 28 the fruit passes over further brushes 30 which serve as a means for additionally spreading the coating composition and brushing moisture from the fruit. These brushes may be the same in character and kind as the brushes 17, or they may be hair brushes. From the zone 18 of the brush passage 17 the fruit enters a drying zone 31. In the drying zone 31 a means for passing heated air onto the fruit may be provided, such as the hood 32 and the fan 33. The end few brushes 34 of the brush run-way may be covered or provided with some fine material, such as a towel or sheepskin for the purpose of imposing upon the fruit a polish. Thus, the polishing and buffing of the fruit goes hand-in-hand with the drying.

The fruit is finally discharged from the brush runway down the chute 35 and onto a conveyor 36.

The fruit is fed or advanced down the runway on account of continuous supply of additional fruit at the forward end of the runway. The supply of additional fruit to the forward end of the runway crowds or pushes the fruit to the discharge end. If no further fruit is supplied, then the fruit remains in substantially stationary position on the runway. This permits the time of treatment of the fruit in the apparatus to be regulated by the rate of supply of the fruit in any desired manner.

The air from the heater hood 32 passes under a main cover or hood 37 of the apparatus up to the forward end of the apparatus, where it is discharged through a stack 38, carrying with it any fumes from the hypochlorite treating solution in the tank 3.

While the particular form of apparatus for treating fruit herein described is well adapted for carrying out the objects of this invention, it is to be understood that various modifications and changes may be made without departing from the spirit of the invention, and the invention is of the scope set forth in the following claims.

We claim:

1. An apparatus for treating fruit comprising, brushes, means for dripping a coating material onto the brushes, means for congealing the coating material on the brushes, and means for operating the brushes for causing the same to spread the coating congealed thereon on the fruit.

2. An apparatus for treating fruit comprising, a polishing means, means for feeding fruit onto the polishing means, and means for directing a current of air against the fruit for forcing the same into contact with the polishing means.

3. An apparatus for treating fruit comprising, smooth surface movable polishing elements, means for positioning fruit upon said polishing elements, and means for creating a current of air against the fruit to urge the same against said polishing elements.

4. An apparatus for treating fruit, comprising a brushway including rotatable brushes, means for rotating said brushes, a cooling spray apparatus disposed above said brushes, and a wax melting receptacle mounted above said brushes and having a restricted outlet for dripping melted wax upon the brushes.

5. In apparatus for treating fruit comprising a fruit brushing means, means for depositing a fluid fruit coating material upon said brushing means, and means for congealing said coating material before the same is applied to the fruit.

6. In apparatus for treating fruit comprising a fruit brushing means, means for depositing a heated fluid fruit coating material upon said brushing means, and means for cooling said coating material before the same is applied to the fruit.

7. In apparatus for treating fruit comprising a fruit brushing means, means for depositing a heated fluid fruit coating material upon said brushing means, and means for cooling said coating material before the same is applied to the fruit, said cooling means maintaining the brushing means and fruit wet during the coating operation.

8. In apparatus for treating fruit comprising brushes, a wax melting receptacle mounted above said brushes, means for dripping a coating material onto the brushes, means for congealing the coating material on the brushes for causing the same to spread the coating congealed thereon on the fruit, a polishing means, means for feeding fruit onto the polishing means, and means for directing a current of air against the fruit for forcing the same into contact with the polishing means.

REX DE ORE McDILL.
LLOYD E. JONES.